United States Patent [19]

Corcoran, Jr. et al.

[11] Patent Number: 5,264,193
[45] Date of Patent: * Nov. 23, 1993

[54] SUBSTITUTED STANNOSILICATES, THEIR PREPARATION AND USE AS NATURAL GAS PURIFICATION AGENTS (C-2668)

[75] Inventors: Edward W. Corcoran, Jr., Easton, Pa.; David E. W. Vaughan, Flemington, N.J.; Paul E. Eberly, Jr., Baton Rouge, La.; Killian D. Efird, The Woodlands, Tex.

[73] Assignee: Exxon Research and Engineering Company, Florham Park, N.J.

[*] Notice: The portion of the term of this patent subsequent to May 5, 2009 has been disclaimed.

[21] Appl. No.: 876,337

[22] Filed: Apr. 30, 1992

Related U.S. Application Data

[63] Continuation-in-part of Ser. No. 848,596, Mar. 9, 1992, Pat. No. 5,192,519, and a continuation-in-part of Ser. No. 486,471, Feb. 28, 1990, Pat. No. 5,110,571, which is a continuation-in-part of Ser. No. 91,657, Sep. 1, 1987, abandoned.

[51] Int. Cl.$^5$ .............................................. B01D 53/14
[52] U.S. Cl. ..................................... 423/230; 95/117; 95/135; 95/136
[58] Field of Search ............... 423/326, 328, 230, 220; 55/30, 75, 76, 73

[56] References Cited

U.S. PATENT DOCUMENTS

| | | | |
|---|---|---|---|
| 4,329,328 | 5/1982 | McAnespie et al. | 423/326 |
| 5,110,568 | 5/1992 | Corcoran, Jr. et al. | 423/230 |
| 5,110,571 | 5/1992 | Corcoran, Jr. et al. | 423/328 |

Primary Examiner—R. Bruce Breneman
Attorney, Agent, or Firm—Jay Simon

[57] ABSTRACT

Natural gas containing hydrogen sulfide is treated at well-head pressures by contact with a crystalline substituted or unsubstituted stannosilicate for removal of hydrogen sulfide.

10 Claims, No Drawings

SUBSTITUTED STANNOSILICATES, THEIR PREPARATION AND USE AS NATURAL GAS PURIFICATION AGENTS (C-2668)

This application is a continuation-in-part of U.S. Ser. No. 848,596 filed Mar. 9, 1992, now U.S. Pat. No. 5,192,519 and U.S. Ser. No. 486,471 filed Feb. 28, 1990, now U.S. Pat. No. 5,110,571, which was a continuation-in-part of U.S. Ser. No. 091,657 filed Sep. 1, 1987, now abandoned.

FIELD OF THE INVENTION

This invention relates to an improved process for the purification of natural gas, which contains mainly methane with smaller amounts of low molecular weight hydrocarbons together with undesirable impurities such as water and sulfur compounds, primarily $H_2S$. The undesirable impurities are removed by sorption on substituted and unsubstituted stanno-silicates, wherein the silicon and substituents are in tetrahedral coordination and the tin is in octahedral coordination. A particular advantage is the stability of said materials under adverse process conditions.

BACKGROUND OF THE INVENTION

Highly crystalline substituted or unsubstituted stanno-silicates have been reported as useful in the separation of hydrogen sulfide from streams containing hydrogen sulfide, hydrogen and hydrocarbons, the hydrocarbons being unspecified.

The production of natural gas, with its concomitant transportation from the well head to refining facilities has been extensively studied. One major problem is the potential for corrosion of the gas transporting pipe (e.g., an iron containing alloy) when the gas contains hydrogen sulfide, particularly in the presence of moisture. Conventional solutions include the removal of water and $H_2S$ with sorbents such as alumina, silica and zeolites, prior to pipeline injection. However, natural gas is often produced at pressures of about 500 psi or higher and most separation methods operate at lower pressures. The most economic mode of operation is to remove of hydrogen sulfide from the gas at the pressure at which the gas is produced, thereby eliminating the necessity for decompressing, treating to remove the sulfides, and recompressing the gas for transportation in the pipeline. Thus, removal of hydrogen sulfide and water at well head pressures permits those pressures to be used directly for transporting the gas through the pipeline. Ideally, the moisture contained in the gas at the well head will be removed using water selective sorbents such as silica gel, alumina zeolites, carbon and like materials.

SUMMARY OF THE INVENTION

Natural gas usually comprises about 80+ % methane, $CO_2$, hydrogen sulfide and water vapor. Normally, the gas is saturated with water vapor. In some instances, the gas at the well head may contain up to about 30% carbon dioxide. However, this invention is not concerned with the removal of carbon dioxide from natural gas, and therefore, the invention is applicable to natural gas streams containing at least about 60%, by volume, of methane, preferably at least about 80 vol % methane. The hydrogen sulfide produced with the gas is removed therefrom by contacting the gas at well head pressures of at least about 500 psi, preferably at least about 3000 psi, with a highly crystalline substituted or unsubstituted stannosilicate, wherein the silicon, or metals substituted therefor are tetrahedrally coordinated through oxygen and tin is octahedrally coordinated. Thus, the framework metals are tin, silicon (and substituents therefor) and oxygen.

The crystalline substituted or unsubstituted stanno silicates have the following generic formula:

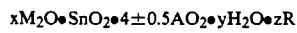

wherein M may be any Group IA metal, or where $M_2O$ becomes MO, Group IIA metal, or a quaternary alkyl ammonium or alkyl amine, e.g., tetra ethyl amine, A is silicon or silicon and germanium, gallium, aluminum, zinc or mixtures thereof; and x is 1.5 to 4,
y is 4 to 15,
R is an amine, and
z is 0 to 4, and where A is silicon and another metal the ratio of (Al, Zn, Ga and/or Ge)/Si is between 0.02 and 0.40. Also, the ratio of tin to the tetrahedrally bonded elements, Si, Al, Zn, Ga, Ge, in the framework is about 1:3.5 to about 1:4.5, essentially all of the tin being in the framework and not exchangeable.

While some of the water vapor may be absorbed by the crystalline material, a multi-stage sorption process may be employed in which the first stage removes water, using, for example, molecular sieves, silica, alumina or carbon.

The crystalline materials are prepared by reacting a base, that is, a Group IA or Group IIA metal (e.g., sodium, potassium cesium, rubidium, magnesium, calcium, strontium) hydroxide or mixtures thereof or quaternary amine with a water soluble tin salt, e.g., chlorides, nitrates, sulfates or salts derived from dissolving tin oxide in an acid or base, and silica or a source of silica and/or a source of soluble forms of germanium, zinc, aluminum, gallium, or mixtures thereof in an aqueous medium at conditions leading to the formation of these novel crystalline materials. Such soluble forms may be germinates, aluminates, gallates, zincates or acid salts of Ge, Al, Zn and/or Ga, such as chlorides, nitrates, sulfates, etc.

Natural gas at the well-head often contains $CO_2$, e.g., in amounts up to about 15%, preferably up to about 5%, and the process is not usually affected by the presence of $CO_2$ in the feed stream. In the event that $CO_2$ reacts with $H_2S$ to form COS, the COS is also selectively removed by the subject material.

DESCRIPTION OF THE INVENTION

The sorbtion process is carried out at well head conditions of least 500 psi, preferably at least 3000 psi, and more preferably about 3000 to 15000 psi and ambient temperatures. However, a particular advantage of the subject crystalline materials is that they are stable at a wide variety of conditions, including well-head temperatures of at least about 75° C., preferably 125° C. to 250° C., conditions under which other materials may degrade and lose sorption capacity, and therefore utility.

Some well-head, natural gas may contain up to 30 vol % hydrogen sulfide, but usually these gases contain less than about 1000 ppm $H_2S$, preferably about 100–1000 ppm. In the process of this invention, using one or more sorbtion stages, at least about 80%, but preferably 99% or more of the $H_2S$ is removable. Of course, the degree of hydrogen sulfide removal is an economic tradeoff. Thus, any degree of removal will improve corrosion resistance characteristics, the greater the degree of hydrogen sulfide removal, the greater the corrosion resistance. However, with increasing hydrogen sulfide removal, pipe line life may be limited by other factors, e.g., stress, fatigue, etc.

Of the several phases of the crystalline materials that may be prepared, and are useful in this application, phase G, whether substituted or unsubstituted, is considered to be most effective for hydrogen sulfide removal under these conditions.

In the case where multi-stages are required for removing water vapor from the treated, well-head gas, any known type of material useful for removing water vapor and stable at well head gas conditions may be employed, e.g., molecular sieves (including natural and synthetic zeolites, phosphates, clays and pillared clays, etc.), silica and alumina-silica gels, aluminas, carbons, etc.

Space velocities, that is, volume of feed per hour per volume of sorbent, whether for $H_2S$ or $H_2O$ or both, are easily determined based on the desired level of hydrogen sulfide removal.

The crystalline materials, whether substituted or unsubstituted can be readily regenerated by either pressure swing or temperature swing methods by passing a small amount of hydrogen through the sorbent for several hours, e.g., 1 to 24 hours, while maintaining a positive pressure (at ambient conditions or a slightly higher pressure at well head conditions) or at a slightly higher temperature than in the sorbing cycle but within the same general temperature range. A system containing two or more separate sorbing zones can easily be pictured, where one zone is sorbing while the others are being regenerated.

Of the metal salts reacted with silica or silica and germania, alumina, zinc, gallia, or mixtures thereof and the tin salt, the alkali metals: lithium, sodium, potassium, rubidium, cesium and mixtures thereof are preferred. Particularly preferred are sodium and potassium or mixtures thereof. In a preferred embodiment, the novel substituted, stannosilicates are formed using a mixed cation preparation, that is, lithium and sodium hydroxides, sodium and cesium hydroxides. Generally, mixtures provide substituted, stannosilicates of enhanced purity over preparations using only one alkali salt.

The reaction generally occurs under autogenous pressure at temperatures above about 90° C. and below about 250° C., preferably 150°-225° C. The ratio of tin to silicon or silicon and substituents is no greater than about 1:20 and preferably about 1:2 to about 1:20, while the ratio of tin to germanium, aluminum, zinc, gallium or mixtures thereof is about 0 to 2.0.

The reactants generally combine to form a gel-like substance and crystallization occurs at reaction temperatures for a period of a few days to several weeks, e.g., seven days to eight weeks. Seeding may reduce these crystallization times to less than two days. After the appropriate time period, the reaction is quenched, the crystalline powder is recovered by, for example, filtration, and thoroughly washed and dried. Drying can be accomplished by an overnight heating at about 100° C. Impurities can be removed by an acid treatment, e.g., 1N HCl. Generally the aluminum substituted forms crystallize in less time than the germanium and gallium forms.

Often, it is preferred to age the reaction mixture at ambient conditions, i.e., below about 50° C. for at least about 3 hours, preferably at least about 24 hours, to allow nucleation. Alternatively, nucleation can be effected by adding a nucleating compound such as a finely divided product or metal oxide, e.g., alumina, or a nucleation solution as used in zeolite synthesis and reported in U.S. Pat. Nos. 3,808,326 and 4,178,352. Up to about 10 vol % nucleating compound can be employed.

Thermal dehydration at, for example, 300° C. will drive off water and the x-ray diffraction pattern will change slightly to show a contraction of the lattice, or movement of cations, or both. In adsorbent or catalytic processes the substituted, stannosilicate is usually dried or calcined to remove pore filling water cations or amine and in the generic formula shown above, y or z or both may then be zero.

The following examples will further illustrate this invention.

Reactant grade stannous chloride pentahydrate and anhydrous stannic chloride were used without further purification. Colloidal silica (Ludox HS-40) was obtained from DuPont and fumed silica (Cabosil) was obtained from Cabot Corp. Germanates, aluminates, zincates and gallates were made by dissolving the respective oxides or hydroxides in hot concentrated alkali solutions. All reactions were carried out hydrothermally in stainless steel autoclaves under autogenous pressures. Powder x-ray diffraction measurements were conducted on a Siemens D500 powder diffractometer using a Siemens DIFFRAC-5 data system.

Reactants were thoroughly mixed at room temperature according to the ratio 2-8 $M_2O:SnO_2:2-20(Si, Al, Zn, Ga, Ge)O_2:0-2:80-180$ $H_2O$ where $M=NH_4$, Na, K, Cs, Li, Rb, or alkyl ($C_1$-$C_4$) quaternary ammonium mixtures of two or more cations. The resulting gel was then reacted at a temperature between 150° C. and 250° C. for period lasting between one week and two months. At the end of this time the autoclave was cooled to room temperature and the solid product separated by filtration. The crystalline powder was then washed repeatedly with water and dried at 100° C. The following are representatives of typical syntheses in the substituted unsubstituted alkali metal stannosilicate system. The phases are identified by their unique x-ray diffraction patterns.

EXAMPLE 1

A tin (IV) chloride pentahydrate (Aldrich) solution was prepared by addition of the solid to distilled water. A second solution was produced by combining sodium hydroxide (Fisher) and 40% colloidal silica (HS-40, DuPont) in distilled water followed by vigorous stirring; a source of alumina was next added to the second solution and sometimes heated to aid in dissolution. The two mixtures were combined at room temperature by slow addition of the alumina silica solution to the aqueous tin chloride solution with rapid stirring (exothermic), producing a thick white gel. The gel was reacted in a polytetrafluoroethylene-lined autoclave (Parr) at 200° C. to produce a white solid after the reactor was cooled to room temperature. This solid was washed repeatedly with distilled water, filtered, and dried to yield a fine white powder. Reactant ratios, sources, and conditions are given in Table 1. Chemical analyses of products are given in Table 2.

TABLE 1

| | | REACTION CONDITIONS | | |
|---|---|---|---|---|
| EXPERIMENT | REACTANT RATIOS | ALUMINA SOURCE | REACTION TIME | PHASE |
| 1 | $2Na_2O:3.8SiO_2:SnO_2:0.1Al_2O_3:80H_2O$ | aluminum oxide hydrate (C-31, Alcoa) | 21 days | A |
| 2 | $2Na_2O:3.6SiO_2:SnO_2:0.2Al_2O_3:80H_2O$ | aluminum oxide hydrate (C-31, Alcoa) | 14 days | A |
| 3 | $2Na_2O:3.8SiO_2:SnO_2:0.1Al_2O_3:80H_2O$ | aluminum chloride hydrate (Baker) | 21 days | A |
| 4 | $2Na_2O:3.6SiO_2:SnO_2:0.2Al_2O_3:80H_2O$ | aluminum chloride hydrate (Baker) | 14 days | A |
| 5 | $2Na_2O:3.6SiO_2:SnO_2:0.2Al_2O_3:80H_2O$ | sodium aluminate (Fisher) | 21 days | A |

TABLE 2

| | CHEMICAL ANALYSIS | | | | |
|---|---|---|---|---|---|
| EXPERIMENT | WT % Na | WT % Sn | WT % Si | WT % Al | WT % Al/Si |
| 1 | 12.16 | 22.79 | 19.51 | 1.60 | .09 |
| 2 | 10.93 | 23.66 | 19.07 | 2.22 | .12 |
| 3 | 10.00 | 25.14 | 20.70 | 1.16 | .06 |
| 4 | 10.17 | 21.76 | 19.77 | 2.09 | .11 |
| 5 | — | — | — | — | — |

Phase A was the only pure phase made in these experiments. The typical x-ray diffraction pattern for phase A is shown in Table 3.

TABLE 3

X-RAY DIFFRACTION PATTERN FOR PHASE A

| dÅ | I/Io |
|---|---|
| 6.33 ± 0.15 | 29 |
| 5.83 ± 0.15 | 100 |
| 5.56 ± 0.15 | 42 |
| 5.19 ± 0.10 | 12 |
| 4.73 ± 0.10 | 8 |
| 4.28 ± 0.10 | 18 |
| 3.30 ± 0.08 | 23 |
| 3.05 ± 0.08 | 73 |
| 2.91 ± 0.05 | 69 |
| 2.77 ± 0.05 | 27 |
| 2.64 ± 0.05 | 11 |
| 2.45 ± 0.05 | 15 |
| 2.35 ± 0.05 | 9 |

EXAMPLE 2

A tin (IV) chloride pentahydrate (Aldrich) solution was prepared by addition of the solid to distilled water; 20% colloidal alumina (AL-20, PQ Corp.) was stirred into this solution and a white precipitate formed. A second solution was produced by dissolving base in distilled water and combining this solution with colloidal silica (HS-40, DuPont). This second mixture was slowly combined with the tin/alumina solution, with vigorous stirring, to produce a thick white gel (exothermic). The gel was reacted in a polytetrafluoroethylene-lined autoclave (Parr) at 200° C. to produce a white solid after the reactor was cooled to room temperature. This solid was washed repeatedly with distilled water, filtered, and dried to yield a fine white powder. Reactant ratios, sources, and conditions are given in Table 4. Chemical analyses of products are given in Table 5. In these experiments Phase A crystallized from the sodium experiments and Phase G from the potassium experiments. A typical X-ray diffraction pattern for Phase G is given in Table 6.

EXAMPLE 3

A tin (IV) chloride pentahydrate (Aldrich) solution was prepared by addition of the solid to distilled water; 20% colloidal alumina (AL-20, PQ Corp.) was stirred into this solution and a white precipitate formed. An aqueous potassium hydroxide (Fisher) solution was added to the tin chloride solution and stirred; colloidal silica (HS-40, DuPont) was added to the mixture (to give a final reactant ratio of $2K_2O:3.8SiO_2:SnO_2:0.1Al_2O_3:80H_2O$) and the resulting gel stirred until homogeneous. The gel was reacted in a polytetrafluoroethylene-lined autoclave (Parr) at 200° C. for 21 days to produce a white solid after the reactor was cooled to room temperature. This solid was washed repeatedly with distilled water, filtered, and dried to yield a fine white powder (Phase G). Chemical analysis indicated 13.67% K, 22.82% Sn, 18.69% Si, and 0.92% Al. A typical X-ray diffraction pattern for Phase G is given in Table 6.

TABLE 4

| | | REACTION CONDITIONS | | |
|---|---|---|---|---|
| EXPERIMENT | REACTANT RATIOS | BASE SOURCE | REACTION TIME | PHASE |
| 6 | $2Na_2O:3.8SiO_2:SnO_2:0.1Al_2O_3:80H_2O$ | sodium hydroxide (Fisher) | 21 days | A |
| 7 | $2Na_2O:3.6SiO_2:SnO_2:0.2Al_2O_3:80H_2O$ | sodium hydroxide (Fisher) | 14 days | A |
| 8 | $2Na_2O:3.6SiO_2:SnO_2:0.2Al_2O_3:80H_2O$ | sodium hydroxide (Fisher) | 21 days | A |
| 9 | $2K_2O:3.6SiO_2:SnO_2:0.2Al_2O_3:80H_2O$ | potassium hydroxide (Fisher) | 21 days | G |

TABLE 5

| | CHEMICAL ANALYSIS | | | | | |
|---|---|---|---|---|---|---|
| EXPERIMENT | WT % K | WT % Na | WT % Sn | WT % Si | WT % Al | WT % Al/Si |
| 6 | — | 10.61 | 24.71 | 20.71 | 1.06 | .05 |
| 7 | — | 13.05 | 24.76 | 18.86 | 2.53 | .14 |
| 8 | — | 11.99 | 23.99 | 18.49 | 5.55 | .31 |
| 9 | 14.22 | — | 22.29 | 18.36 | 2.22 | .13 |

TABLE 6

X-RAY DIFFRACTION PATTERN FOR PHASE G

| dÅ | I/Io |
|---|---|
| 8.05 ± 0.20 | 17 |
| 6.58 ± 0.15 | 59 |
| 5.86 ± 0.15 | 76 |
| 5.35 ± 0.15 | 8 |
| 5.06 ± 0.10 | 18 |
| 4.84 ± 0.10 | 7 |
| 4.37 ± 0.10 | 40 |
| 4.02 ± 0.10 | 13 |
| 3.59 ± 0.08 | 18 |
| 3.51 ± 0.08 | 16 |
| 3.27 ± 0.08 | 17 |
| 3.12 ± 0.08 | 8 |
| 3.05 ± 0.08 | 19 |
| 2.98 ± 0.05 | 100 |
| 2.93 ± 0.05 | 38 |

TABLE 7

| M | M$_2$O: | SnO$_2$: | SiO$_2$: | H$_2$O | Reactant Source and Additional Comments | Days | Temp. °C. | Phase |
|---|---|---|---|---|---|---|---|---|
| Na (ex 1) | 2 | 1 | 4 | 80 | colloidal silica, SnCl$_4$.5H$_2$O | 21 | 200 | A(some L) |
| Na (ex 2) | 2 | 1 | 4 | 80 | fumed silica, SnCl$_4$.5H$_2$O | 21 | 200 | B, A, L |
| Na | 2 | 1 | 4 | 80 | Na$_2$SnO$_3$, colloidal silica | 21 | 200 | A(good) |
| Na | 2 | 1 | 4 | 80 | colloidal silica, SnCl$_4$.5H$_2$O, cold age | 21 | 200 | B(some L) |
| Na | 2 | 1 | 4 | 80 | colloidal silica, SnCl$_4$.5H$_2$O, agitation | 21 | 180 | B(some L init.) |
| Na | 2 | 1 | 4 | 80 | colloidal silica, SnCl$_4$.5H$_2$O, sl. Al$_2$O$_3$ or seeds | 7-28 | 200 | B |
| Na | 2 | 1 | 4 | 80 | colloidal silica, SnCl$_4$.5H$_2$O, TEA | 21 | 180-200 | A(some L) |
| Na | 2 | 1 | 4 | 80 | "N", SnCl$_4$.5H$_2$O | 21 | 200 | L and A |
| Na | 2 | 1 | 4 | 80 | "N", SnCl$_4$.5H$_2$O, TEA | 14 | 200 | L |
| Na | 2 | 1 | 4 | 80 | "N", SnCl$_4$.5H$_2$O, TEA | 14 | 180 | L(some B) |
| Na* | 4-8 | 1 | 4 | 80 | "N", SnCl$_4$.5H$_2$O | 14 | 150 | amorphous |
| Na* | 2 | 1 | 6 | 80 | colloidal silica, SnCl$_4$.5H$_2$O | 21 | 200 | amorphous |
| Na | 2.2 | 1 | 4 | 80 | "N", Na$_2$SnO$_3$ | 21 | 150 | L |
| Na | 2.2 | 1 | 4 | 80 | "N", Na$_2$SnO$_3$ | 21 | 200 | A(some L) |
| Na | 3 | 1 | 6 | 80 | "N", Na$_2$SnO$_3$ | 25 | 200 | L |
| Na | 6 | 1 | 4 | 80 | "N", Na$_2$SnO$_3$ | 28 | 150 | L |
| Na (ex 3) | 5 | 1 | 10 | 80 | colloidal silica, SnCl$_4$.5H$_2$O | 14-60 | 150-200 | L(good) |
| Na* | 2-5 | 1 | 20 | 110-125 | colloidal silica, SnCl$_4$.5H$_2$O | 30 | 200 | quartz |
| Na | 4 | 1 | 4 | 80 | colloidal silica, SnCl$_4$.5H$_2$O | 30 | 200 | L |
| 1:1 Na:Li (ex 2) | 2 | 1 | 4 | 80 | colloidal silica, SnCl$_4$.5H$_2$O | 30 | 150-200 | B(good) |
| 1:1 Na:K | 2 | 1 | 4 | 80 | colloidal silica, SnCl$_4$.5H$_2$O | 7 | 150 | A |
| 1:1 Na:K | 2 | 1 | 4 | 80 | colloidal silica, SnCl$_4$.5H$_2$O | 7 | 200 | A and L |
| K (ex 4) | 2 | 1 | 4 | 80 | colloidal silica, SnCl$_4$.5H$_2$O | 5-30 | 150-200 | G |
| K | 5 | 1 | 10 | 80 | colloidal silica, SnCl$_4$.5H$_2$O | 3-30 | 150- | G |
| Cs (ex 5) | 2 | 1 | 4 | 95 | colloidal silica, SnCl$_4$.5H$_2$O | 30 | 200 | K |
| Cs | 5 | 1 | 10 | 180 | colloidal silica, SnCl$_4$.5H$_2$O | 17-30 | 200 | O |
| Rb | 2 | 1 | 4 | 80 | colloidal silica, SnCl$_4$.5H$_2$O | 17 | 200 | N |
| Li | 2 | 1 | 4 | 80 | colloidal silica, SnCl$_4$.5H$_2$O | 60 | 200 | M |

| X-RAY DIFFRACTION PATTERN FOR PHASE G | |
|---|---|
| dÅ | I/Io |
| 2.86 ± 0.05 | 53 |
| 2.75 ± 0.05 | 12 |
| 2.67 ± 0.05 | 14 |
| 2.57 ± 0.05 | 10 |
| 2.50 ± 0.05 | 12 |
| 2.41 ± 0.05 | 9 |
| 2.14 ± 0.05 | 14 |
| 2.04 ± 0.05 | 12 |
| 1.93 ± 0.05 | 19 |
| 1.84 ± 0.05 | 10 |

EXAMPLE 4

Unsubstituted Potassium Stannosilicate (Phase G)

A 22.5 g quantity of potassium hydroxide was dissolved in 10.0 g of distilled water and added slowly to 25.9 g HS-40 (40% colloidal silica). A second solution was prepared from 20.0 g water and 15.1 g stannous chloride. The two solutions were combined to make a gel which was thoroughly mixed; water was added to make 100 g total weight. This corresponded to a reaction ratio of 2K$_2$O:SnO$_2$:4SiO$_2$:80H$_2$O. The mixture was reacted at 175° C. for 7 days followed by workup as described above to give a crystalline phase with a distinctive diffraction pattern, as shown in Table 6.

Table 7, below, shows a variety of unsubstituted stannosilicate compositions which are in accordance with this invention, items noted with an asterisk resulted either in an amorphous structure or a quartz structure and are not part of this invention. In Table 8, sl is slight, TEA is triethanolamine and Examples 1-5 are as noted.

While the preparations shown in Table 7 are similar to the previous examples, in some instances the mixture was cold aged for a short period to promote nucleation and then held at reaction temperature for the requisite time period. In another instance a small amount of Al$_2$O$_3$ was added for the same purpose.

The foregoing examples show the preparation of unsubstituted and substituted stannosilicate phases having structures comprised of corner sharing tin oxide octahedra and silicon or silicon and germanium, aluminum, zinc, gallium oxide or mixtures thereof, tetrahedra. These frameworks are generated hydrothermally from reaction gels containing base cations and a source of tin, silicon and germanium, aluminum, zinc, or gallium or mixtures thereof. The structure that results from a particular synthesis is highly dependent on the cation employed in the reaction. Cation mixtures were employed in several syntheses to generate new phases or to improve the purity of phases produced by single-cation systems.

What is claimed is:

1. A process for removing H$_2$S from a feed stream containing primarily natural gas and including H$_2$S, which comprises contacting the feed stream at well head conditions with a crystalline, substituted or unsubstituted stannosilicate wherein the framework of the stannosilicate contains tin in octahedral coordination and tetrahedrally coordinated silicon or silicon and a metal selected from the group consisting of aluminum, gallium, germanium, zinc or mixture thereof.

2. The process of claim 1 wherein crystalline stannosilicate has the formula:

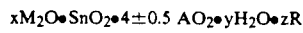

$$xM_2O \bullet SnO_2 \bullet 4 \pm 0.5\ AO_2 \bullet yH_2O \bullet zR$$

wherein M is a Group IA metal, a Group IIA metal where upon M$_2$O becomes MO, or a quaternary amine, A is silicon or silicon and germanium, gallium, zinc, or aluminum and mixtures thereof, and
x is 1.5 to 4,
y is 4 to 15,
R is an amine, and
z is 0 to 4.

3. The process of claim 1 wherein well head conditions include pressures of at least about 500 psi.

4. The process of claim 1 wherein well head conditions include pressures of at least about 3000 psi.

5. The process of claim 1 wherein the feed stream also contains $CO_2$ and $H_2O$.

6. The process of claim 1 wherein the $H_2S$ level of the feed stream is reduced by at least about 80%.

7. The process of claim 2 wherein a feed stream is first passed through a bed or beds of sorbent to remove water, such that at least 90% of the water vapor in the feed stream is removed.

8. A process of claim 2 wherein two or more sorbent beds selectively remove water, $H_2S$ and COS.

9. A process of claim 7 wherein the separate beds are contained within a single vessel.

10. The process of claim 7 wherein the water vapor sorbent is selected from the group consisting of molecular sieves, metal phosphates, clays, silica gel, silica-alumina gel, alumina, or carbon.

* * * * *